United States Patent
Klassen

(10) Patent No.: US 7,692,832 B2
(45) Date of Patent: Apr. 6, 2010

(54) METHOD FOR CORRECTING SCANNER NON-UNIFORMITY

(75) Inventor: R Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1016 days.

(21) Appl. No.: 11/410,798

(22) Filed: Apr. 25, 2006

(65) Prior Publication Data

US 2007/0247681 A1    Oct. 25, 2007

(51) Int. Cl.
*G03F 3/08* (2006.01)
(52) U.S. Cl. .......................... 358/518; 358/504; 358/1.9
(58) Field of Classification Search .................. 358/1.9, 358/505, 532, 504, 446; 382/170, 289, 112, 382/128; 33/551; 250/548; 356/303; 156/277
See application file for complete search history.

(56) References Cited

U.S. PATENT DOCUMENTS

| | | | | | |
|---|---|---|---|---|---|
| 5,298,761 A | * | 3/1994 | Aoki et al. | ................. | 250/548 |
| 5,790,281 A | * | 8/1998 | Knox et al. | ................. | 358/504 |
| 6,086,706 A | * | 7/2000 | Brassil et al. | ............... | 156/277 |
| 6,151,423 A | * | 11/2000 | Melen | ........................ | 382/289 |
| 6,554,388 B1 | * | 4/2003 | Wong et al. | ................... | 347/19 |
| 6,571,000 B1 | * | 5/2003 | Rasmussen et al. | ......... | 382/112 |
| 6,760,056 B2 | | 7/2004 | Klassen et al. | | |
| 6,943,919 B1 | | 9/2005 | Barnick | | |
| 2002/0021456 A1 | * | 2/2002 | Toriyama | ................... | 358/446 |
| 2002/0080430 A1 | * | 6/2002 | Pilloud | ...................... | 358/505 |
| 2003/0161520 A1 | * | 8/2003 | Yamano et al. | ............. | 382/128 |
| 2004/0136013 A1 | | 7/2004 | Mestha et al. | | |
| 2005/0071104 A1 | | 3/2005 | Viturro et al. | | |
| 2005/0238232 A1 | * | 10/2005 | Ying et al. | ................... | 382/170 |
| 2007/0033819 A1 | * | 2/2007 | McFarland | .................... | 33/551 |
| 2008/0024778 A1 | * | 1/2008 | Honda et al. | ................ | 356/303 |

OTHER PUBLICATIONS

U.S. Appl. No. 11/268,294, filed Nov. 4, 2005, Klassen.
Kemele, Schmidt and Berdine, Basic Statistics, ISBN 1-880156-06-7, pp. 9-76.

* cited by examiner

*Primary Examiner*—Twyler L Haskins
*Assistant Examiner*—David L Suazo
(74) *Attorney, Agent, or Firm*—Pillsbury Winthrop Shaw Pittman LLP

(57) ABSTRACT

A method for identifying and correcting for spatial variation within scanning bars includes performing diagnostic scans of at least one sheet, in which a sheet(s) is scanned in various orientations and translations, with each of the orientations identified. The diagnostic scans are registered with one of the individual diagnostic scans to produce registered scans. The registered scans are averaged to create a master scan corresponding to the sheet, such that the master scan is indicative of the spatial variation within the sheet.

21 Claims, 5 Drawing Sheets

FIG. 4
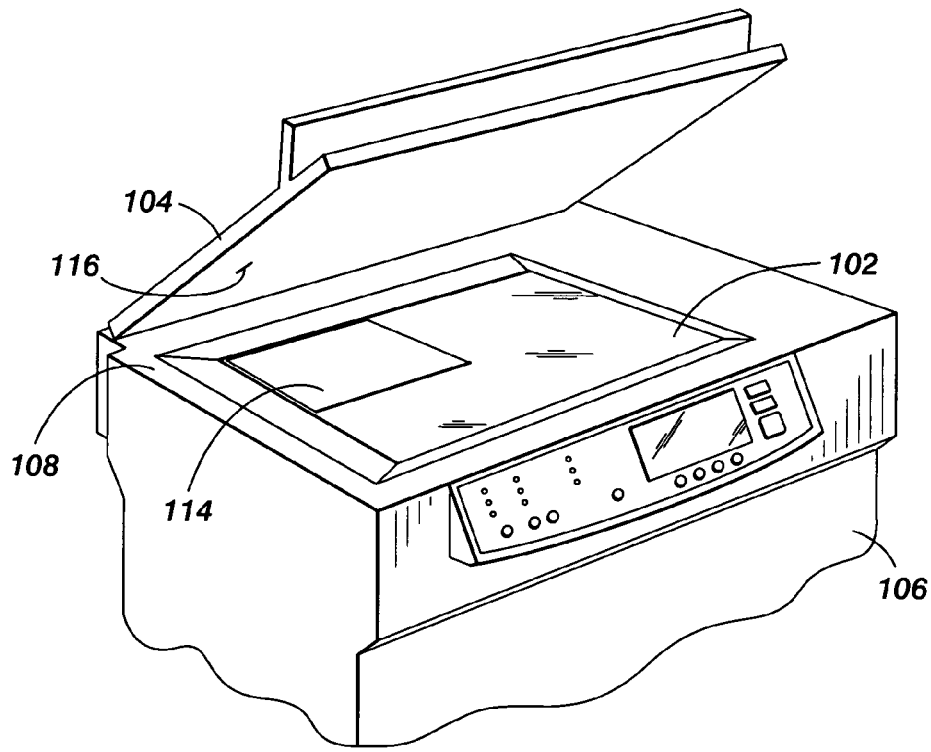
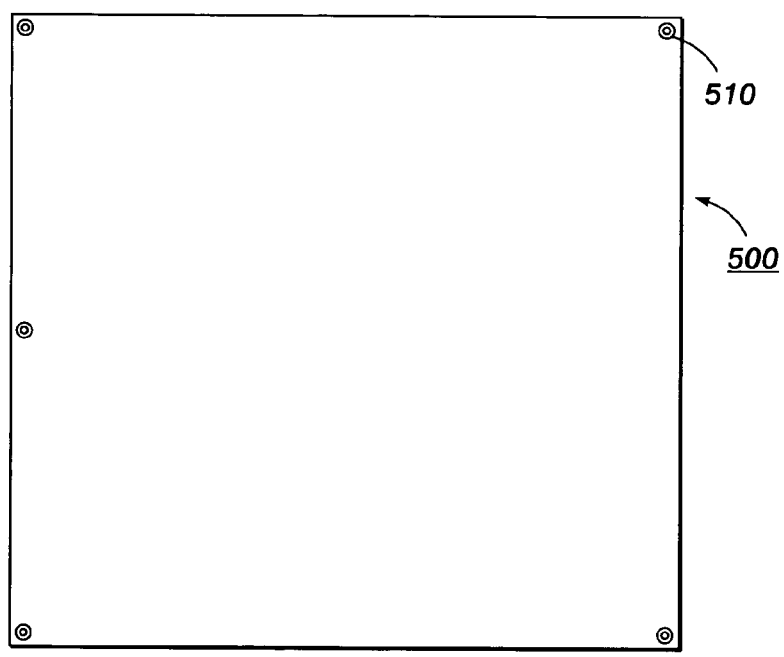
FIG. 5

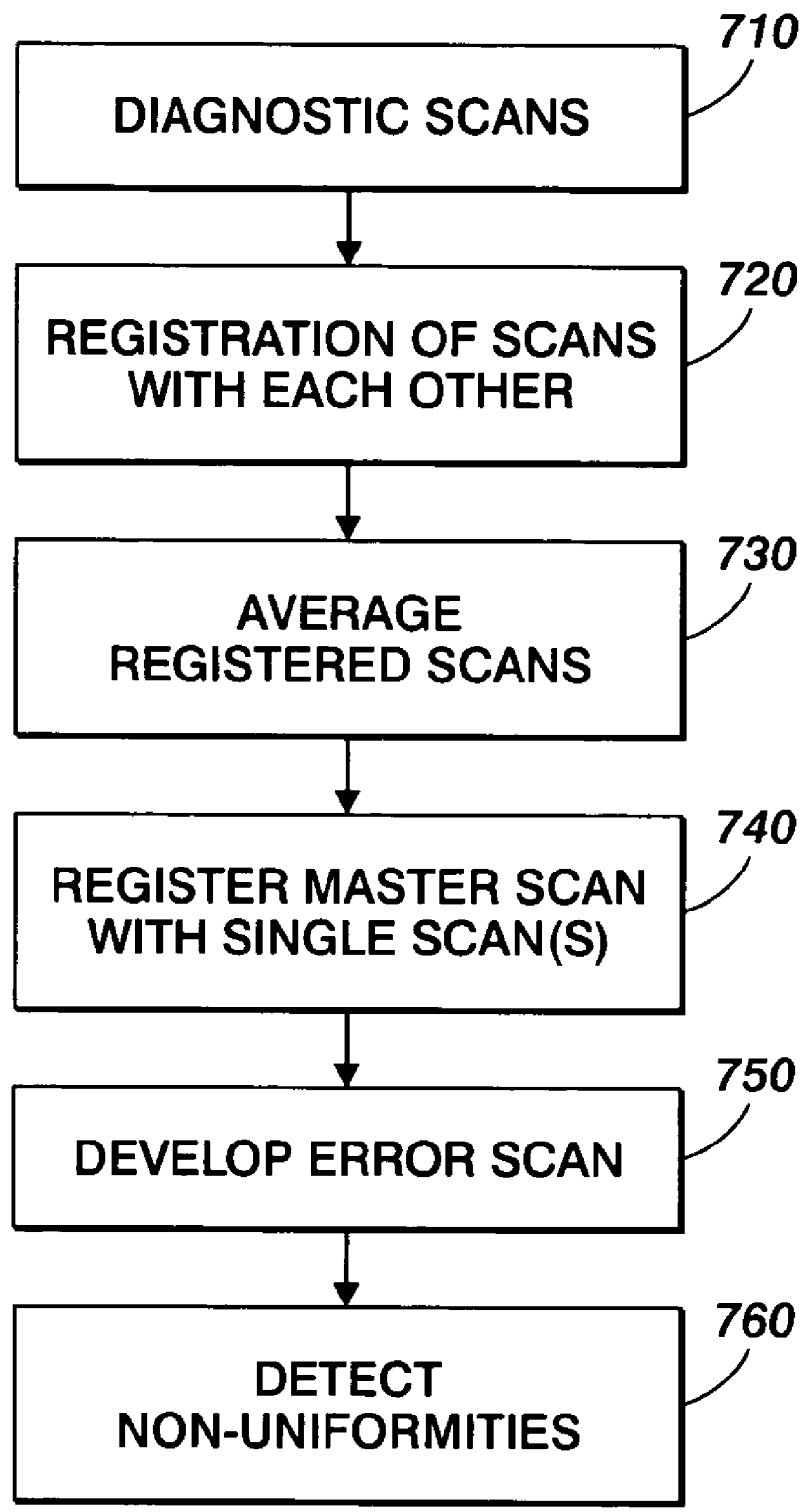

METHOD FOR CORRECTING SCANNER NON-UNIFORMITY

BACKGROUND AND SUMMARY

This disclosure relates generally to correcting non-uniformity defects in a printed image, and more particularly to a method of correcting for spatial variation within scanning bars.

In the past, scanners have been made either as moving spot scanners, in which a single sensor and light source sequentially scan in across a page in a fast scan direction, and then advance to a next position in a slow scan direction before scanning again in the fast scan direction; or as full width array scanners, in which a large collection of sensors and one or more light sources simultaneously capture information from an entire line of the page in the Full width array type scanners have more complex electronic devices but simpler electromechanical systems. For a given speed, they also have much lower bandwidth requirements at the sensor, and lower light level requirements, such that the sensor obtains enough photons in the time it spends at a given position. For these reasons and others, full width array scanners have become the low cost option in recent years.

As is generally the case when multiple sensors are used to measure a single phenomenon, the outputs of the various sensors are not identical when the input values are. This is partially due to sensor noise, (which is not systematic), and partially due to manufacturing variability in the sensors themselves. FIG. 1 shows a schematic of one full width array color scan bar, with the view of the bar from the paper being scanned. Color filters of three colors, a row of red filters 120, green filters 130, and blue filters 140, as well as a row of clear filters 110, are deposited at regular intervals on the surface of the bar. The "slow-scan direction" indicated in FIG. 1 is the direction of paper feed in the marking system, and the "fast-scan direction" is the direction substantially perpendicular to the slow-scan direction. FIG. 2 shows the same bar, in side view. Light flowing through the filters 210 strikes the CCD sensors which comprise (among other components) a gating layer, an epitaxial layer 220, and a substrate 230. Charges travel through the epitaxial layer, primarily downward, with the amount of charge proportional to the amount of light passing through each filter. The amount of charge passing through the epitaxial layer is converted to a digital value and reported as the amount of a given color at a given location.

One source of variability in the amount of light sensed is variation in the thickness of the color filter. Others include manufacturing variations in the thickness and physical makeup of the epitaxial layer. As a result there are variations in the amount of light required at any given location along the array to produce the same digital value. In order to reduce this variability a bar may be calibrated by illuminating a strip of a constant white reflectance with a uniform illumination, and exposing the scan bar to the light reflected from this strip. A difficulty with this method is that the quality of the calibration is only as good as the uniformity of the white strip. Strips with reflectance variation of approximately 1% or less are readily available: strips with reflectance variation of 0.1% or less are very difficult and expensive to manufacture. For most consumer applications a 1% reflectance variation is more than sufficient for the task. For some sensing applications, where the scanner is being used as a measuring device, rather than an image sensor, tighter tolerances are required. For example, in the application exemplified by U.S. Pat. No. 6,760,056 to Klassen et al., an objective is to correct variations sensed on a page, and caused by a printing device. It is well-known (see, e.g., Basic Statistics by Kemele, Schmidt and Berdine, ISBN 1-880156-06-7, p 9-76) that in order to measure an effect and correct it, the measuring system needs to have a tenth the variation of the effect being corrected. Thus, if variation of 1% reflectance is the tolerable limit for a printer's output, the sensor must have variation of less than 0.1%.

However, even if the variability of the calibration strip were zero, there would still be the possibility for the introduction of variability, as illustrated by FIG. 3. Because of the geometry of the sensors, some charge from the red light migrates from the clear to the red sensor; some migrates to the green sensor; some charge from green migrates from clear and green to red, and from green to blue; and some charge from blue migrates from blue to green and from clear to red. Because sensor-to-sensor variability is calibrated out under white light, these charge migrations are compensated for when white or grey is scanned. However, in the case of a red region of a page, no charges generated by the green or blue components of the light migrate to adjacent sensors, since there are negligible green or blue components of the light. Any variation in the green filter has no effect on the charges received at the red sensor, but because the calibration was done with white light, variation in the green filter is included in the correction for non-uniformity. Therefore the non-uniformity is over-corrected for red, resulting in an appearance of non-uniformity, even after calibration with a perfectly uniform calibration strip. When the corrected grey is uniform to within 0.3%, "corrected" red has been observed to exhibit up to 5% variation. Various methods exist of improving the uniformity of the scan bar and calibration strip, however they may be too expensive for common use.

All U.S. patents and published U.S. patent applications cited herein are fully incorporated by reference. The following patents or publications are noted:

U.S. Pat. No. 6,554,388 to Wong et al. ("Method for Improving Printer Uniformity") describes generating a test print having a series of test patches or zones with predetermined density levels. A scanner scans the test print to obtain density value readings within each test density zone for each pixel that corresponds to each exposure element. Density value readings are averaged and the difference in measurement from this average is used to compute a correction factor for each individual exposure element. An image data manager conditions the input data by the correction factor, then sends the conditioned image data to the image forming assembly for printing.

U.S. Pat. No. 6,571,000 to Rasmussen et al. ("Image Processing Algorithm for Characterization of Uniformity of Printed Images") teaches an image quality metric directed to printed images which are intended to have a uniform color, but which show visible color variations. The color variation may take various forms, both with respect to the type of color difference and with respect to the spatial nature of the non-uniformities. The image quality analysis system distinguishes between non-uniformities in the categories of amplitude modulated cluster dot halftone patterns, frequency modulated halftone patterns, irregular two-dimensional variations from noise, isolated (non-periodic) one-dimensional streaks, periodic, one-dimensional bands, and two-dimensional periodic variations. The results from the image quality analysis are then used as a basis for diagnosing machine problems.

U.S. Pat. No. 6,760,056 to Klassen et al. ("Macro Uniformity Correction for X-Y Separable Non-Uniformity") describes a method of rendering a raster output level and determining an image position of a pixel of interest within an image. An intended raster output level, which corresponds to the pixel of interest, is received into a processing device. A final raster input level is determined as a function of the image position and the intended raster output level. The final input level and the image position are transmitted to an output device. An actual raster output level is rendered, via the output device, at a position on an output medium corresponding to the image position. The actual raster output level substantially matches the intended raster output level.

U.S. Pat. No. 6,943,919 to Barnick ("Method and Apparatus for Correcting Defects in a Spatial Light Modulator Based Printing System") teaches transmitting a digital image to at least one spatial light modulator and capturing the resulting image. The variation in intensity between each image pixel and at least one reference image pixel is compared and a correction factor is derived. The correction gain at each code value for each image pixel is determined and the correction factor is applied with the gain to the digital image.

U.S. Patent Application Publication No. 2004/0136013 to Mestha et al. ("Systems and Methods for Obtaining a Spatial Color Profile, and Calibrating a Marking System") describes obtaining tone reproduction curves for calibrating a marking system using a test pattern with a plurality of patches extending in two directions and crossing each other. Reflectance values are obtained from the first and second test patches. A set of gray balanced tone reproduction curves are obtained based on the reflectance values of the first test patches, and a set of spatial gray balanced tone reproduction curves are obtained based on the reflectance values of the second test patches.

U.S. Patent Application Publication No. 2005/0071104 to Viturro et al. ("Method for Calibrating a Marking System to Maintain Color Output Consistency Across Multiple Printers") teaches a method for maintaining consistent color output across printers even when the inline sensors have differences in accuracy due to various technical and environmental factors. A spectrophotometer is used to measure the color quality of printed references. Adjustments are then iteratively made until reference charts of desired color quality are obtained. Using the printed reference measured by the inline sensor, control systems of each machine are calibrated. At customer sites and at suitable intervals, a referent document can be read using the inline sensor on a reference machine and any differences from expected values can be calibrated out.

The disclosed embodiments provide examples of improved solutions to the problems noted in the above Background discussion and the art cited therein. There is shown in these examples an improved method for identifying and correcting for spatial variation within scanning bars. The method includes performing diagnostic scans of at least one sheet, in which at least one sheet is scanned in various orientations and translations, with each of the orientations identified. The diagnostic scans are registered with one of the individual diagnostic scans to produce registered scans. The registered scans are averaged to create a master scan corresponding to the sheet, such that the master scan is indicative of the spatial variation within the at least one sheet.

In another embodiment there is disclosed a system for identifying and correcting for spatial variation within scanning bars. The system includes means for performing diagnostic scans of at least one sheet, in which at least one sheet is scanned in various orientations and translations, with each of the orientations identified. The diagnostic scans are registered with one of the individual diagnostic scans to produce registered scans. The registered scans are then averaged to create a master scan to the sheet, such that the master scan is indicative of the spatial variation within the at least one sheet.

BRIEF DESCRIPTION OF THE DRAWINGS

The foregoing and other features of the embodiments described herein will be apparent and easily understood from a further reading of the specification, claims and by reference to the accompanying drawings in which:

FIG. 4 illustrates one embodiment of a scanner capable of utilizing the method for correcting for scanner non-uniformity;

FIG. 5 illustrates one embodiment of a test sheet to be utilized in the method for correcting for scanner non-uniformity;

FIG. 7 is a flow diagram that shows one embodiment of the method of correcting for scanner non-uniformity.

DETAILED DESCRIPTION

Figure 1:
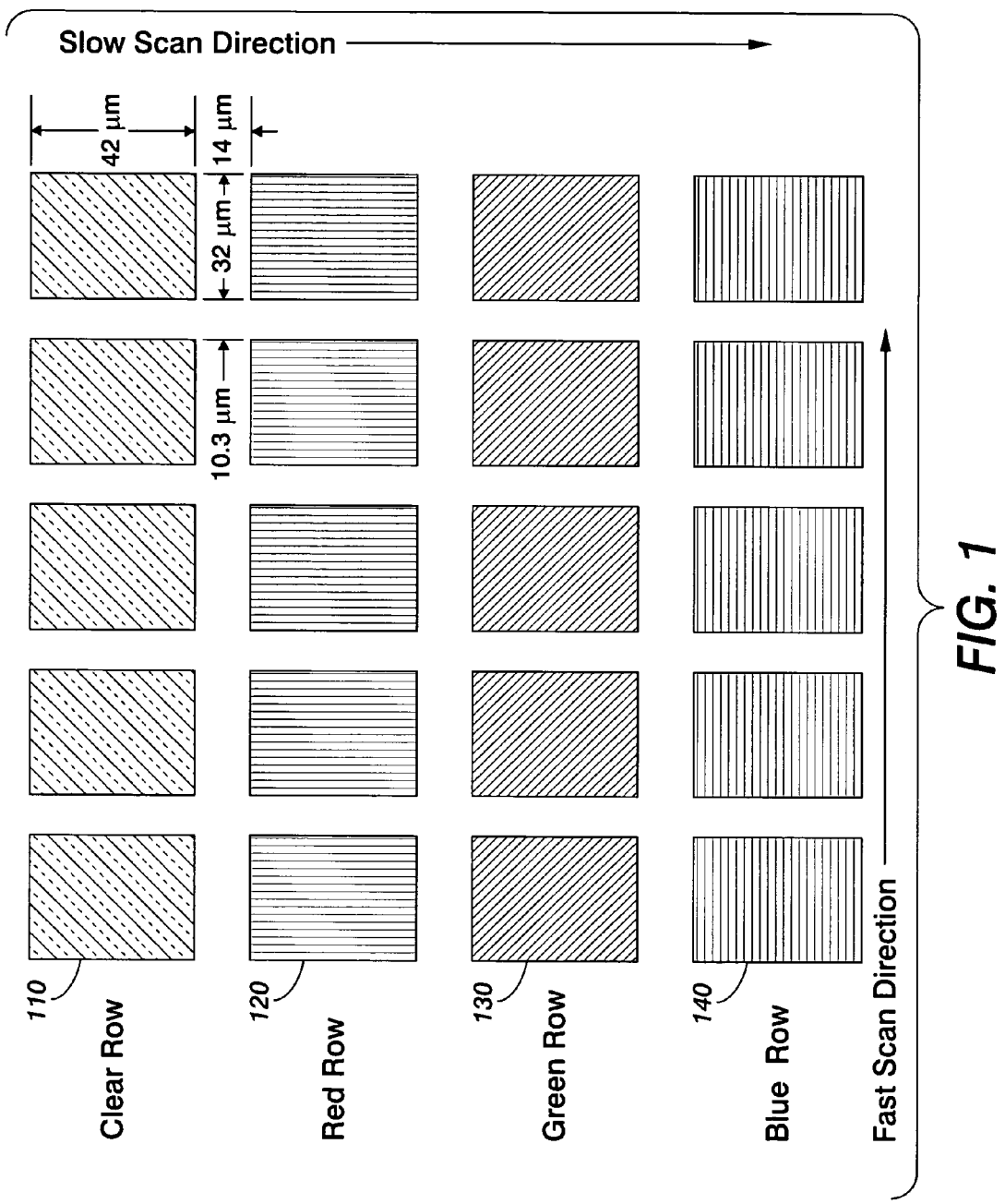
FIG. 1 illustrates a schematic plan view of a full width array color scan bar.
Figure 2:
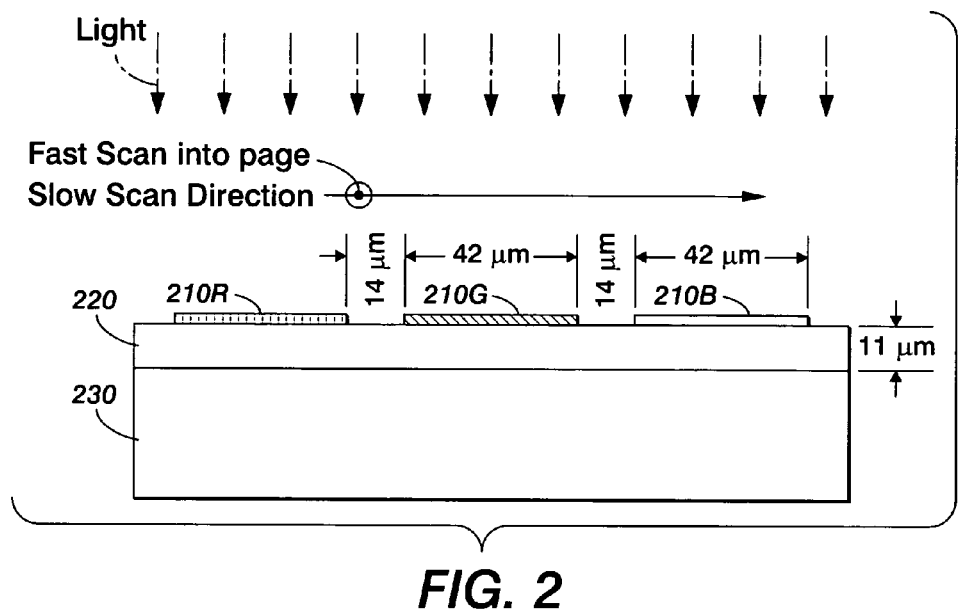
FIG. 2 illustrates a side view of the color scan bar according to FIG. 1.
Figure 3:
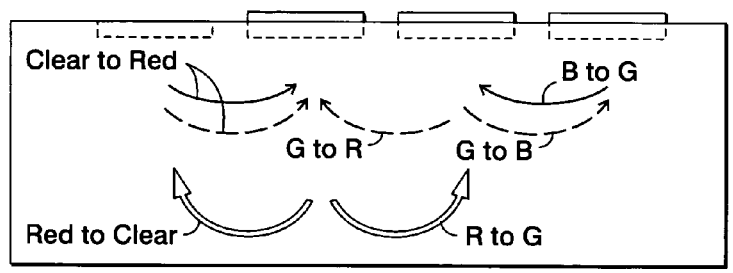
FIG. 3 illustrates variability introduced by the geometry of the sensors.

In the following detailed description, reference is made to the accompanying drawings, which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the disclosure. The following detailed description is, therefore, not to be taken in a limiting sense.

The method of correcting for scanner non-uniformity as described herein uses approximately uniform pages and the scanner itself to characterize their non-uniformity rather than assuming perfect uniformity of the test pages. The pages are scanned in multiple orientations and translations, each, so that any within-page non-uniformity may be separated from scanner non-uniformity. Once all of the scans are registered with each other, the within-page non-uniformity may be determined by finding a robust estimate of the central tendency of each pixel (in scanner color space). From the ideal scan so computed, a scanner-induced error may be computed from each of the scans, by registering the ideal scan with it, and comparing the two images. Errors that are consistent across scans are then saved for use in later correction. Once enough pages have been scanned in this way to provide a satisfactory sampling of color space, a correction may be determined as a function of pixel location and color.

Referring now to FIG. 4, there is illustrated one example of a scanning device on which the method for correcting for non-uniformity may be practiced. The device 106 provides a rectangular platen 102 on the top surface 108 of the machine 106. The generally rigid, generally rectangular platen cover 104 is attached with hinges 110 to the top surface 108 of the machine 106 along the back side 112 of the machine adjacent to the platen 102. The platen cover 104 pivots on the axis of the hinges 110 to swing down to cover the platen 102 and a document 114 on the platen 102 to be scanned and to swing up to allow the document 114 on the platen 102 to be removed or repositioned on the platen 102. The rectangular platen cover 104 generally has a surface area equal to or slightly larger than the surface area of the platen 102 (and the document 114 on the platen 102) so that when closed the platen cover 104 completely covers the platen 102.

One example of such a scanner has a platen 11 in.×17 in. in size. Its two primary sources of non-uniformity include:
  a. Fast-scan non-uniformity, consisting of variation across the scan bar, is caused by many sources, but is generally constant with position in the slow scan direction. One of the sources of non-uniformity is known to have a period of 372/600=31/50 of an inch. This results from the chip-to-chip boundaries of the sensing chips on the scan bar.
  b. Slow scan non-uniformity, consisting of variation in the direction in which the scan bar is moving. It is caused by variation in lighting as the bar moves down the page, as well as such things as temperature changes, and motion quality in the slow scan direction.

In order to eliminate effects of page variation, multiple scans of a page are taken in multiple locations and rotations, and the artifacts that appear to be part of the print are separated from those that appear to be introduced by the scan. For the scanner the horizontal translations should be an integer multiple plus a half of a chip width, i.e., 372n+186 pixels. The intent is that when the page is slid from one side to the other of the platen, any periodic defect known or suspected to exist in the scanner is phase shifted by a half period on the page. The usable portion of the platen glass is $11^{15}/_{16}$ inches in width. One acceptable test sheet therefore is a 7.9 inch (4745 pixel) square sheet of paper, as illustrated in FIG. 5, preferably with five fiducial marks 510 in the outer ¼ inch along each side, arranged to avoid ambiguity with respect to rotation. Although the fiducial marks 510 illustrated in FIG. 5 are curved, it is noted that the fiducial marks may be of any form and in any configuration. Within the quarter inch margin, the sheet is a constant color, produced either xerographically (for the purposes of this example, only with solid colors, to avoid the issue of halftoning), or photographically.

For a different scanner, if there are other suspected non-uniformities with a known repeat period, those should be taken into account, maintaining horizontal translation of an integer plus ½ of a repeat period. A square sheet maximizes the usable area of the page that may be scanned in multiple orientations (rotations by multiples of 90 degrees). The larger the sheet, subject to the above constraints, the greater the overlap region, improving the quality of the result.

The print sample itself may have streaks, bands, mottle, and optically induced color variation. All of these may or may not exceed the visual threshold. Subsequent image processing should eliminate their effect. To allow for some variation in the scanner's (mis)behavior as a function of color, the method described below must be repeated with different colored sheets. For the description below, only one sheet is used.

Figure 6:
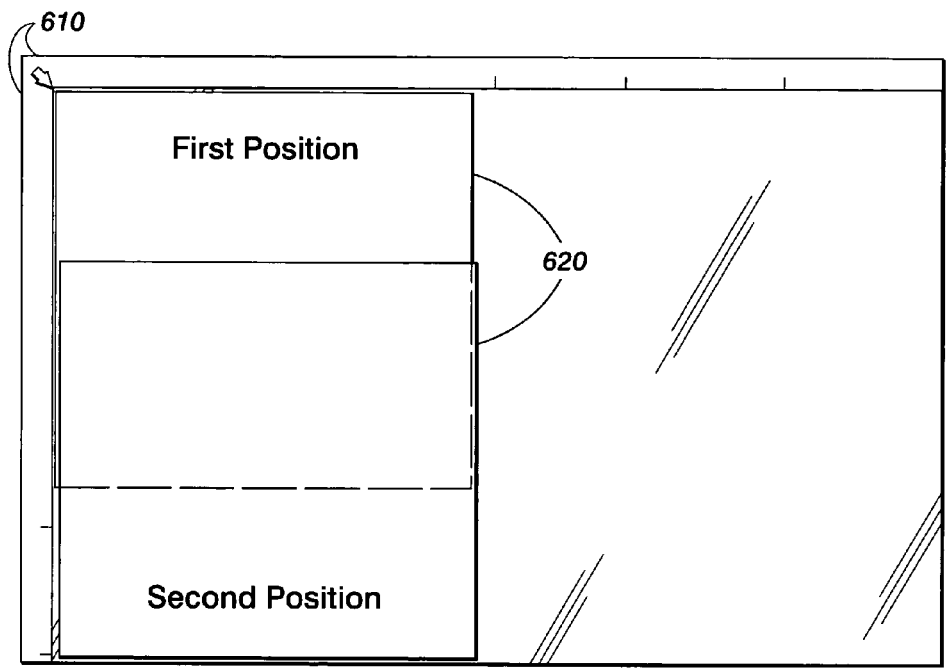
FIG. 6 illustrates placement of the test sheet of FIG. 5 on the platen of a scanning device.

Turning now to FIG. 6, for the purposes of this description it is assumed that the sample is scanned eight times. There are four orientations, each at 90 degrees from the last. For each of these orientations there are two positions for the test sheet 620 on platen 610: one with the page maximally slid to the edge away from the mask on the platen (shown as $1^{st}$ location in FIG. 6), the other with the page visually aligned to the mask (shown as $2^{nd}$ location in FIG. 6). While a few mm error in alignment (<⅛") is acceptable, an error greater than ¼" is not. Alternatively, one could use only two orientations, and possibly more horizontal translations. A larger number of scans, each with a different orientation and/or translation, increases the quality of the result, at the cost of increased effort.

The scans will have some degree of integrating cavity effect causing the edge regions (as much as several cm) of each scan to differ from the center. If the scans are broken down into tiles, an integrating cavity effect correction may be calculated on a tile-by-tile basis. This is more efficient than the Knox' method, which calculates the correction on a pixel-by-pixel basis. Then the correction can be scaled up using linear interpolation and applied to the full resolution image. Integrating cavity effect correction may be omitted, for some scanners. Knox' method of correcting for integrating cavity effect is described in U.S. Pat. No. 5,790,281 to Knox et al ("Method of Correcting the Measured Reflectance of an Image Acquired by an Image Acquisition Device for the Integrating Cavity Effect"). A low resolution tile based method is described in U.S. patent application Ser. No. 11/268,294 to Klassen ("Method for Correcting Integrating Cavity Effect for Calibration and/or Characterization Targets"), hereby incorporated by reference.

Turning now to FIG. 7, at 710 diagnostic scans are performed as described above with respect to FIG. 6. The scans are registered with each other at 720. Once the eight scans have been obtained, one is selected as the preliminary master scan. The fiducial marks are located in each of the eight scans, and each of the seven scans not the master is registered with the master, which is to say, a transformation is determined that minimizes the root mean square (rms) error between the locations of the centers of the fiducials in the master and the centers of the corresponding fiducials in the other scan, and then that transformation is applied to the raster (predetermined pattern of scanning lines) of the other scan. The transformation is also stored separately, so its inverse may be used later. Alternatively, if fiducial marks are not used, the corners of the image or centroids of image regions can be used to find the transformation. Preferably, there is sufficient asymmetry to the image that the rotation may be determined automatically. If not, the user can identify the orientation of each of the scans.

The registered scans are averaged at 730 to produce a master scan used for eliminating within-page non-uniformities. When all seven non-master scans have been registered to the master, and corrected for integrating cavity effect, the mean and standard deviation of each pixel (across scans) is computed. For a given pixel, if any scan at that pixel is outside of two standard deviations from the mean, that scan is not included at that pixel. Generally, no more than two scans will contribute errors due to scan artifacts at any given pixel, however, these artifacts can be (and likely will be) on the same side of the mean. At this point pixels should be stored at a bit depth of not less than 11 bits, as an average of eight 8-bit scans increases the bit resolution by three. Practically speaking, the master scan could be stored not as an average, but as the sum of the eight, but with appropriate scale factors introduced where an outlier was eliminated (i.e., ⅞ times the sum of seven, ⅔ times the sum of six).

At this point there are eight original images, mutually registered, and a ninth image built from the (potentially trimmed) mean of the remaining eight. This ninth image is the master image, representing a good estimate of the true page signature—how the page differs from uniform, in RGB scanner units.

The master scan is registered with a single scan at 740 and the scanner-induced error is computed. Each of the eight non-master scans will differ from the master in ways that are entirely induced by the scanner, along with minor losses introduced due to finite precision arithmetic on finite resolution images. Noise introduced by the scanner will be either random, or consistent noise. For a given scan, both random and consistent noise may be determined by subtracting the master image from that scan. To do this, the master must first be registered with the scan using the inverse of the transformation that was used earlier to register the scan with the master. This will ensure that the locations of any artifacts found are registered to the scanner's coordinate frame, and not the print coordinates. After registering the master to the non-master scan, the master is subtracted from the non-master scan, producing an error image at 750.

Non-uniformities are detected and/or corrected at 760. Consider first variations in the scanned image across the fast scan direction. To capture such variations at high fidelity, the average of the error image, down each column of pixels, is taken to produce a single, average, error scanline. This scanline should start at the 0th pixel of the scanned image, regardless of which image was used to generate it. It can be zero-padded from the 0th pixel to the start of the actual image, and from the end of the image to the edge of the correction region. Applying this procedure to every scan gives eight estimates of the scanner's behavior, four of which are missing (and hence zero-padded) about 3 inches of the left, and four of which are missing about 3 inches of the right. These can be optionally written to a file, one pixel per line, to be read into a spreadsheet for further analysis, specifically separating out scan-to-scan variation from trends that are consistent across scans. During the analysis, the zero padding pixels should be ignored.

Variations in the scanned image down the slow scan direction may be captured in a similar fashion, by averaging the error image across each row, again ignoring padding pixels, to produce an error column.

If correction, rather than mere characterization is the goal, a greater degree of automation may be desired. In this case, rather than transferring the data to a spreadsheet, some statistical analysis may be applied to the collection of averages. The average for each pixel in the error scanline is computed, possibly with one or more outlying values removed. The average for each pixel in the error column may also be computed in like fashion. These averages may be passed on to the correction phase.

In a given scan it is not unlikely that at least some of the values will be small. For example, in a red or green page, one would expect small blue values. Small values are relatively prone to noise, and for that reason should be given less weight in calculating corrections. In order to compute a conservative correction, compute the standard deviation of each average error, and divide by the root of the number of pixels contributing to obtain a standard error of the mean. Also compute the percentile rank of the errors computed, as a number in the [0 . . . 1] range (i.e., the 50th percentile has value 0.5); scale and shift it to the [−1 . . . 1] range. Now multiply the scaled and shifted percentile by the standard error of the mean, and subtract that from the computed average error. This provides a conservative estimate of the error, reduced most if the value seems improbable, but not reduced by much if the apparent error of the error estimate is itself small.

Once a master scan has been computed for a given sample page, additional scanners may be characterized without as many rotations of the scan. A single scan may be used, although it is then difficult to distinguish single-scan noise from noise that is consistent from scan to scan. Hence multiple scans are preferred, although they need not be at all orientations or even at multiple translations. This may be advantageous when characterizing a scanner with an automatic transport.

It may also be advantageous to compute a scanner-to-scanner correction specific to that page, by computing the single matrix, which, when applied to every pixel of the master scan produces a pixel of a color that, on average, is as close as possible to the corresponding pixel of the new scanner's result from scanning the same page. The single matrix can be computed using least squares fitting.

From a single page, it may be possible to make a sufficient correction to a scanner, depending on the scanner's behavior with respect to color. In the simplest case, a white page is scanned to obtain a correction for each scanline and each row. The size of the correction might be scaled by the RGB values found in the image. The correction, possibly scaled, would be subtracted from subsequent scans, at least those scans for which this degree of precision is needed. More generally, at least two pages would be needed, one representing the light end of the tone scale and one representing the dark end. The two corrections found from the two pages would be linearly interpolated and extrapolated according to the lightness of the pixel.

Most generally, many pages from many parts of color space would be used, and corrections specific to each part of color space would be found. In a linear model, enough pages would be used to produce the data needed to form a color correction matrix per pixel. Other models are also possible, such as one in which a more complex color correction method is applied to each pixel, such as spline interpolation or tetrahedral interpolation or a higher order color correction matrix. In any event, the result of evaluating the model could either be amounts to subtract from each pixel, or the resulting values for that pixel.

While the present discussion has been illustrated and described with reference to specific embodiments, further modification and improvements will occur to those skilled in the art. For example, when the master scan is registered with a single scan, the single scan may be from a different scanner than the scanner used to produce the master scan, although the spectral sensitivities of the two should be similar. Alternatively, when the error scan is used to correct for scanner non-uniformities, the correction could involve averaging across and/or down the page, and it could involve multiple other scans. Also, more than one page (with different colors on the different pages), generating more than one master scan could be used, to allow tone scale or full color corrections.

It is to be understood, therefore, that this disclosure is not limited to the particular forms illustrated and that it is intended in the appended claims to embrace all alternatives, modifications, and variations which do not depart from the spirit and scope of the embodiments described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method for identifying and correcting for spatial variation within scanning bars, the method comprising:
    performing a plurality of diagnostic scans of at least one sheet, wherein said at least one sheet is scanned in a plurality of orientations and translations, and wherein each of said orientations can be identified;
    registering said plurality of diagnostic scans with at least one of said diagnostic scans to produce registered scans; and averaging said registered scans to create a master scan corresponding to said at least one sheet, wherein said master scan is indicative of the spatial variation of said at least one sheet.

2. The method for identifying and correcting for spatial variation within scanning bars according to claim 1, wherein registering said plurality of diagnostic scans comprises:
   selecting one of said diagnostic scans as a preliminary master scan;
   determining a transformation that minimizes the error between the locations of image features in said master scan and a second scan; and
   applying said transformation to the raster of said second scan.

3. The method for identifying and correcting for spatial variation within scanning bars according to claim 2, wherein said image features comprise at least one member selected from the group consisting of fiducial marks, image edges, and centroids of image regions.

4. The method for identifying and correcting for spatial variation within scanning bars according to claim 2, wherein said locations include the centers of fiducial marks in said master scan and the centers of the corresponding fiducials in said second scan.

5. The method for identifying and correcting for spatial variation within scanning bars according to claim 1, further comprising:
   registering said master scan with each of said marking scans to produce a registered master scan; and
   comparing said registered master scan with said each of said marking scans to produce an error image of the scanner and detecting variations in said error image.

6. The method for identifying and correcting for spatial variation within scanning bars according to claim 1, further comprising correcting for integrating cavity effect, wherein said integrating cavity effect causes the edge regions of each said diagnostic scan to differ from the center of said diagnostic scan.

7. The method for identifying and correcting for spatial variation within scanning bars according to claim 6, wherein correcting for integrating cavity effect comprises:
   breaking said diagnostic scans into tiles;
   calculating an integrating cavity effect correction on a tile-by-tile basis;
   scaling the correction up utilizing linear interpolation; and
   applying said correction to the full resolution image of each of said diagnostic scans.

8. The method for identifying and correcting for spatial variation within scanning bars according to claim 6, wherein correcting for integrating cavity effect comprises:
   calculating an integrating cavity effect correction on a pixel-by-pixel basis; and
   applying said correction to the full resolution image of each of said diagnostic scans.

9. The method for identifying and correcting for spatial variation within scanning bars according to claim 1, wherein averaging said registered scans to create a master scan comprises computing the mean and standard deviation of each pixel across said diagnostic scans and disregarding a scan for an individual pixel that exceeds a predetermined number of standard deviations from the mean for said individual pixel.

10. The method for identifying and correcting for spatial variation within scanning bars according to claim 1, wherein creating said master scan comprises constructing a new image from said computed mean for each pixel of said scanned images.

11. The method for identifying and correcting for spatial variation within scanning bars according to claim 5, wherein comparing said master scan with each of said diagnostic scans comprising subtracting said master image from at least one of said scanned images.

12. The method for identifying and correcting for spatial variation within scanning bars according to claim 11, wherein subtracting said master image from said at least one scanned image comprises applying the inverse of said transformation developed for registering said diagnostic scans to said preliminary master.

13. The method for identifying and correcting for spatial variation within scanning bars according to claim 5, wherein detecting variations comprises:
   computing the average of the error image, down each column of pixels, to produce a single average error scanline across the fast scan direction for each of said scanned images; and
   applying further analysis to separate out scan-to-scan variation from trends that are consistent across scans.

14. The method for identifying and correcting for spatial variation within scanning bars according to claim 5, wherein detecting variations comprises:
   computing the average of the error image, .across each row of pixels, to produce a single average error column for the slow scan direction for each of said scanned images; and
   applying further analysis to separate out scan-to-scan variation from trends that are consistent across scans.

15. The method for identifying and correcting for spatial variation within scanning bars according to claim 5, further comprising correcting variations in said scanned image or in at least one subsequent scanned image.

16. The method for identifying and correcting for spatial variation within scanning bars according to claim 15, wherein correcting variations comprises at least one member selected from the group consisting of subtracting error values from each pixel, subtracting interpolated error values from each pixel, evaluating a model to produce a correction amount, and evaluating a model to produce a corrected color value.

17. A method for identifying and correcting for spatial variation within scanning bars, the method comprising:
   performing a plurality of diagnostic scans of at least one sheet, wherein said at least one sheet is scanned in a plurality of orientations and translations, and wherein each of said orientations can be identified;
   registering said plurality of diagnostic scans with at least one of said diagnostic scans to produce registered scans;
   averaging said registered scans to create a master scan corresponding to said at least one sheet, wherein said master scan is indicative of the spatial variation of said at least one sheet;
   registering said master scan with each of said marking scans to produce a registered master scan;
   comparing said registered master scan with said each of said marking scans to produce an error image of the scanner and detecting variations in said error image; and
   correcting variations in said scanned image or in at least one subsequent scanned image,
   wherein correcting variations in said scanned image or said at least one subsequent scanned image comprises:
   computing the standard deviation of each said average of the error image and dividing by the square root of the number of pixels contributing to obtain a standard error of the mean;

determining the percentile rank of said errors computed;

multiplying said percentile rank by said standard error of the mean; and subtracting said standard error of the mean from said computed average error.

18. The method for identifying and correcting for spatial variation within scanning bars according to claim 1, wherein said at least one sheet comprises at least one member selected from the group consisting of a single white sheet, a sheet representing the light end of the color scale and a sheet representing the dark end of the color scale, or a plurality of sheets representing a plurality of the parts of the color space.

19. The method for identifying and correcting for spatial variation within scanning bars according to claim 15, wherein correcting variations in said scanned image comprises applying either spline interpolation or tetrahedral interpolation to each pixel.

20. The method for identifying and correcting for spatial variation within scanning bars according to claim 1, wherein performing a plurality of diagnostic scans comprises:

scanning at least one sheet in a first location on a scanner platen;

scanning said at least one sheet in a second location on said scanner platen;

rotating said at least one sheet 90 degrees and scanning said at least one sheet in said first location on said scanner platen;

scanning said rotated at least one sheet in said second location on said scanner platen; and repeating rotating said at least one sheet 90 degrees and scanning said at least one sheet in each of said first location and said second location on said scanner platen until scans of all orientations of said sheet have been performed.

21. A system for identifying and correcting for spatial variation within scanning bars, the system comprising:

means for performing a plurality of diagnostic scans of at least one sheet, wherein said at least one sheet is scanned in a plurality of orientations and translations, and wherein each of said orientations can be identified;

means for registering said plurality of diagnostic scans with at least one of said diagnostic scans to produce registered scans; and means for averaging said registered scans to create a master scan corresponding to said at least one sheet, wherein said master scan is indicative of the spatial variation of said at least one sheet.

* * * * *